April 2, 1935.    G. D. ARNOLD    1,996,395
METHOD OF MANUFACTURING FOOD PRODUCTS
Filed March 24, 1932

Inventor
Gerald D. Arnold
By Wheeler, Wheeler and Wheeler
Attorneys

UNITED STATES PATENT OFFICE 1,996,395

METHOD OF MANUFACTURING FOOD PRODUCTS

Gerald D. Arnold, Wauwatosa, Wis.

Application March 24, 1932, Serial No. 600,953

5 Claims. (Cl. 99—11)

This invention relates to improvements in a method of manufacturing food products.

It is the primary object of the invention to provide novel and improved means not only for producing a suitable admixture of molasses or the like with forage foods, but also for facilitating the dehydration of the forage foods and material admixed therewith.

The utility of food mixtures containing molasses is well known, but the difficulties of mixing molasses with other food products in commercial practice have heretofore been great due to the characteristics of the molasses and the difficulty in handling the mixture. In accordance with the present invention it is preferred that the molasses shall be mixed with green produce of a higher moisture content than the molasses because it is found that a very much more thorough mixture can be easily effected when the produce is green than is possible if the produce is already dehydrated.

Not only can a better mixture be effected, but a greater quantity of molasses can be incorporated in a wet product and then dehydrated than in a dry product without reducing the mixture to a sticky mass which cannot properly be handled and will not keep without fermentation. Furthermore, the admixture of the molasses with a wet product results in better distribution of the molasses through produce and a more uniform degree of dehydration in the completed mixture.

In the second place, it is preferred that the admixture of molasses with the produce or like material be effected in the course of handling such material for other purposes, whereby no additional apparatus is required and the admixture is easily, speedily and economically achieved.

In the third place, this invention contemplates the preferred admixture of molasses and green produce while these component ingredients are moving freely through space out of contact with the apparatus handling the mixture and under circumstances such that there is little or no opportunity for the molasses to encounter any parts of the apparatus upon which they might become adherent to clog or otherwise hamper the functioning of the mechanism.

In the fourth place, the present invention contemplates the dehydration of the mixture in the presence of both heat and air flow and under partial vacuum, the rate of air movement being sufficient to carry off the moisture, and the heat being used not merely for the purpose of evaporating the moisture, but also for the purpose of softening the molasses constituent of the mixture to such an extent that even in the absence of its moisture it will serve as a binder to enable the mixed ingredients to be pressed into blocks or cakes notwithstanding the dehydration of the material to a degree such that, except for the heat, the molasses would not be substantially adhesive and would not serve to retain the form of such cakes or blocks.

Finally, it is a very important objective of the present invention to employ the molasses as an important element in the dehydration process. Commercial molasses contains only a small percentage of water and is very hygroscopic, being capable of absorbing from the atmosphere or any adjacent wet surfaces, sufficient moisture to dissolve itself. One of the problems involved in all dehydration of green produce relates to the extraction of moisture from the stems and relatively tough portions of the produce without employing heat so excessive as to scorch or desiccate the lighter leaf portions of the produce. I have found that by exposing the green produce to the action of molasses for a certain period preliminary to the use of heat for dehydration, the molasses will penetrate the fiber of the produce and tend to open the pores of the produce and to draw to the surface the moisture therein contained. On the surface this moisture is readily exposed to the heat and to the air employed in the dehydrating apparatus and is evaporated with greater uniformity and with greater ease, with less heat and with consequent less alteration of the chemical constituents of the produce than has heretofore been possible.

The drawing discloses diagrammatically apparatus whereby the process embodying this invention may be practiced.

Like parts are identified by the same reference characters throughout the several views.

The preferred form of dehydrating apparatus may be that disclosed in my companion application Serial No. 432,366 filed March 1, 1930 and entitled Portable dehydrating apparatus. It includes a furnace 4 from which heated air and products of combustion are delivered to a drum or series of concentric drums 5 into which the material to be dried is also delivered through hopper 6.

Figure 3:
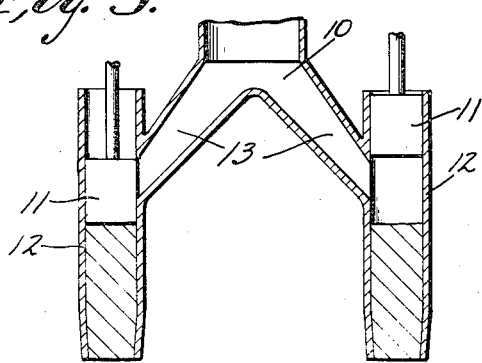
Figure 3 shows, in vertical axial section, a form of press which may be used in converting the completed product into cakes.

The movement of the heated gases is preferably induced under partial vacuum by a suction fan 7 at the outlet of the apparatus, which discharges into a collector 8 from which the material issues either into a sacking device 9 or a brick forming device such as that shown at 10 in Fig. 3. In the latter case a pair of pistons 11 reciprocate alternatively in a well known manner in cylinders 12, the outlet portions of which are restricted to compact beneath the piston the material entering the cylinders through the bifurcated delivery ducts 13.

The apparatus already described is of conventional, or previously known and commercially available design.

It is preferred that the produce to be dehydrated shall be comminuted, as by a feed cutter. Comminution exposes the cut ends of the stalks and leaves and thereby facilitates extraction of moisture from the produce. It also increases the surface area to receive the molasses used in accordance with the present invention.

At 15 I have shown a feed cutting device to which the green produce is delivered at 16. The cut produce is thrown or projected from the comminuted mechanism by the cutter in the form of a spray as shown at 17. The pipes 18 and nozzles 19 supply molasses under pressure in the form of a fine jet or spray which encounters the particles of comminuted produce while the latter are in free space following their delivery from the feed cutter. Because of the arrangement disclosed, the contact of all the molasses with the comminuted green produce is virtually assured, and there is little possibility that any of the molasses will reach immediately any portion of the mechanism.

The molasses coated particles of green produce fall on an apron conveyor 20 which is of sufficient length and moves sufficiently slowly to give the molasses adequate time to act on the produce for the extraction of juices from the particles of green produce. Because of this arrangement, the molasses is enabled to exercise its hygroscopic qualities in bringing the moisture to the surface of the particles of produce to facilitate evaporation in the manner already described.

From the apron conveyor 20 the mixture of produce and molasses passes to the elevating conveyor 21 which feeds hopper 6 of the dehydrating machine.

As already noted, the fact that the plant pores have been opened and that the juices have been brought to the surface of the plant particles by the molasses, greatly facilitates the action of the heated gases on the moisture in the dehydrating mechanism. It is possible to use lower temperatures than would otherwise be required and thereby to preserve to a greater degree than has heretofore been possible, the nutritious food substances in the plants, including vitamins, which are altered or destroyed by the presence of excessive heat.

As an example of the operation of the molasses in this regard, it may be stated that if green alfalfa having approximately an eighty per cent moisture content is wrung by hand, it is only possible to extract three or four per cent of the moisture, whereas, if the same alfalfa is first mixed with molasses and then wrung by hand, its moisture content can be reduced from eighty per cent to sixty five or seventy per cent, and apparently without extracting as much of the chlorophyl or nutritious juices of the alfalfa.

It is further found that in the presence of the molasses there is little or no tendency for the surfaces of the green produce to become hard and dry (virtually case hardened) in the manner sometimes noted in dehydration in the absence of molasses. Apparently, the hygroscopic action of the molasses not only extracts and brings to the surface the juices of the plant material, but also opens the pores thereof.

The moisture content of the green produce may average 75%, while the moisture content of molasses is approximately 25%, making the moisture content of the mixture less than that of the usual wet produce entering the dryer. No moisture or diluted molasses will drip or run out of mixture. Because of the thorough incorporation of the molasses in the mixture, the molasses will not burn on or stick to drum of the conventional dryer, especially if drying is done under partial vacuum as in the machine disclosed. In the rapid evaporation of moisture from a wet product the tendency is to cool the product being dried until moisture content is materially reduced or product nearly dry. This process of rapidly evaporating the moisture and cooling the product retains in the product practically all of the feed nutriments without chemical or vitamin change. The water or moisture only is taken out of the product, the molasses remaining incorporated in and a part of the dried product.

The drying operation in the dehydrator may be carried to any desired degree. If the product is to be bagged, the dehydration will preferably be so regulated that the product will not be materially sticky on delivery from the machine. If the product is to be formed into bricks or blocks through some such packing device as that shown in Fig. 3, the temperature of the machine will preferably be so maintain that the molasses in the delivered product will be softened by the heat of the product independently of the moisture content therein, so that as the bricks cool they will not be unduly sticky but will, nevertheless, retain their form because of the heat-induced adhesion of the molasses.

No means has heretofore been employed to produce a brick of molasses-treated produce in which the molasses could act as a binder without being adhesive in the ultimate condition of the brick. In fact, it has been difficult to make any form of brick from molasses mixed with a dried product because the amount of molasses which can be incorporated in a dry product without rendering the product objectionably adhesive, has been too small to be of value.

Figure 1:
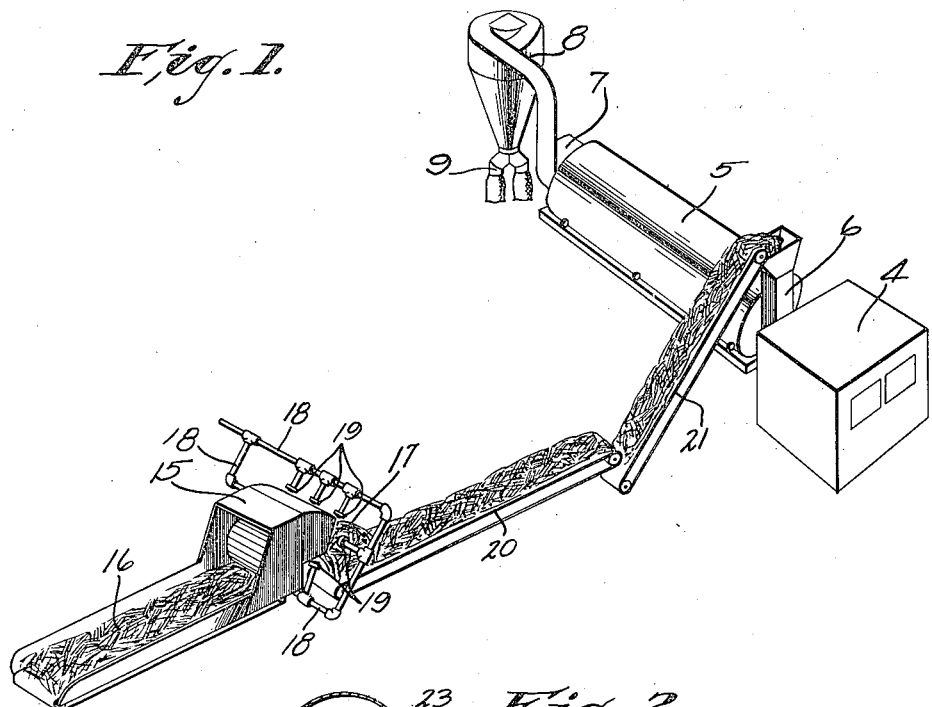
Figure 1 is a view in perspective, showing apparatus for chopping produce, admixing molasses therewith, permitting the action of the molasses on the produce for a predetermined time interval in a continuous operation, delivering the mixture to dehydrating apparatus, and dehydrating, delivering, and sacking the product.
Figure 2:
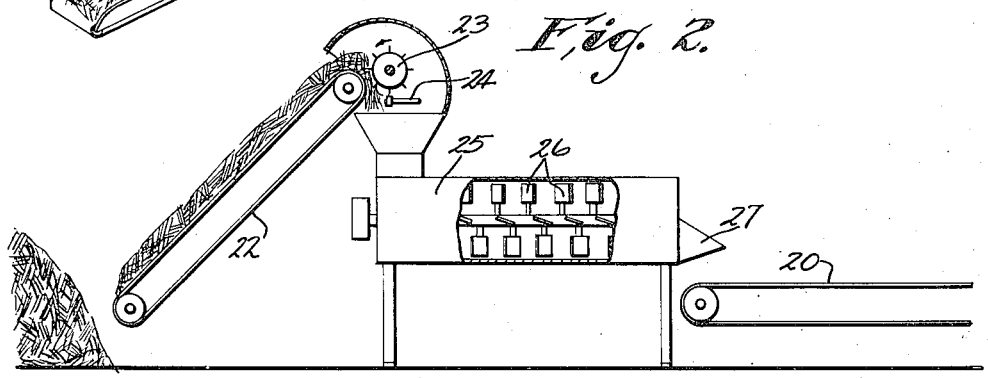
Figure 2 is a view partially in side elevation and partially in longitudinal section, showing means for the mechanical admixture of produce and molasses preliminary to the delivery of the mixture to the conveying and dehydrating mechanism disclosed in Fig. 1.

Figure 2 merely shows the green produce fed by means of conveyor 22 past a regulating wheel 23 beneath which molasses from jet 24 is delivered to the material. The combined ingredients pass into a mixing chamber 25 in which a paddle conveyor 26 mixes and advances the molasses treated produce to discharge the same at 27 on to a treating apron 20 such as that disclosed in Fig. 1.

In all forms of the invention the molasses is preferably mixed with green produce, which should for best results be comminuted. In all forms also, a period of treatment is given on belt 20 to enable the molasses to have time to extract juices from the cells of the green produce.

The Fig. 1 construction avoids the use of the special mixer shown at Fig. 2, and requires no addition to existing apparatus other than the molasses delivery system and the treating conveyor 20.

While many forms of dehydrating apparatus may be used in carrying out this invention, that diagrammatically disclosed herein and more fully described in the co-pending application above referred to, is preferred for best results because it offers a convenient and practical means of employing heat and a large flow of heated gases under satisfactory regulation to produce exactly the desired degree of dehydration and such temperatures in the discharged product as may be required for the formation of bricks or blocks.

I claim:

1. The process of producing an edible vegetable product, said process consisting in the treatment with hygroscopic molasses of small particles of vegetable matter in the substantial absence of free water which is wet with moisture contained within its cells, whereby to draw the moisture from the cells of said particles to the surfaces thereof and to draw the molasses into said cells, and subsequently dehydrating the admixture of vegetable matter and molasses.

2. The process of manufacturing an edible dehydrated food product which consists in comminuting green vegetable matter, treating the comminuted matter containing the natural juices of growing material with molasses, and subsequently dehydrating the mixture of molasses and vegetable matter.

3. The process of manufacturing a dehydrated food product which consists in comminuting green produce containing normal juices of growth, delivering the comminuted produce through space, spraying the produce with molasses in the course of such delivery, continuing the treatment of the produce with the molasses for a period sufficient to insure incorporation of the molasses within the cells of said product and the drawing of moisture to the surface of the produce by the molasses, and the subsequent dehydration of the mixture.

4. The process of manufacturing a dehydrated food product which consists in comminuting green produce containing in its cells the normal moisture content of growing produce, delivering the comminuted produce through space, spraying the produce with molasses in the course of such delivery, continuing the treatment of the produce with the molasses for a period sufficient to insure incorporation of the molasses within the cells of said product and the drawing of moisture to the surface of the produce by the molasses, and the subsequent dehydration of the mixture in the presence of a heat sufficient to soften the molasses (independently of a moisture content sufficiently high to make it soft), and compressing the dehydrated mixture while warm, whereby to take advantage of the adhesive qualities of the softened molasses to produce a product which will be non-adhesive when cool.

5. The process of manufacturing an edible dehydrated forage product which process consists in admixing molasses with a freshly cut forage crop containing in normal amounts the juices of growth, exposure of said crop material to the molasses for a period sufficient to permit the molasses to enter the cells of the crop material and the hygroscopic withdrawal of juices from said cells to the surface of such material, and the subsequent dehydration of the admixture of molasses and forage crop material to a degree sufficient to permit the handling and storage thereof.

GERALD D. ARNOLD.